June 17, 1958     A. SILVERMAN     2,838,882
METHOD OF PRODUCING GLASS

Filed Jan. 30, 1952     2 Sheets-Sheet 1

INVENTOR
ALEXANDER SILVERMAN
BY
ATTORNEY.

June 17, 1958
A. SILVERMAN
2,838,882
METHOD OF PRODUCING GLASS
Filed Jan. 30, 1952
2 Sheets-Sheet 2
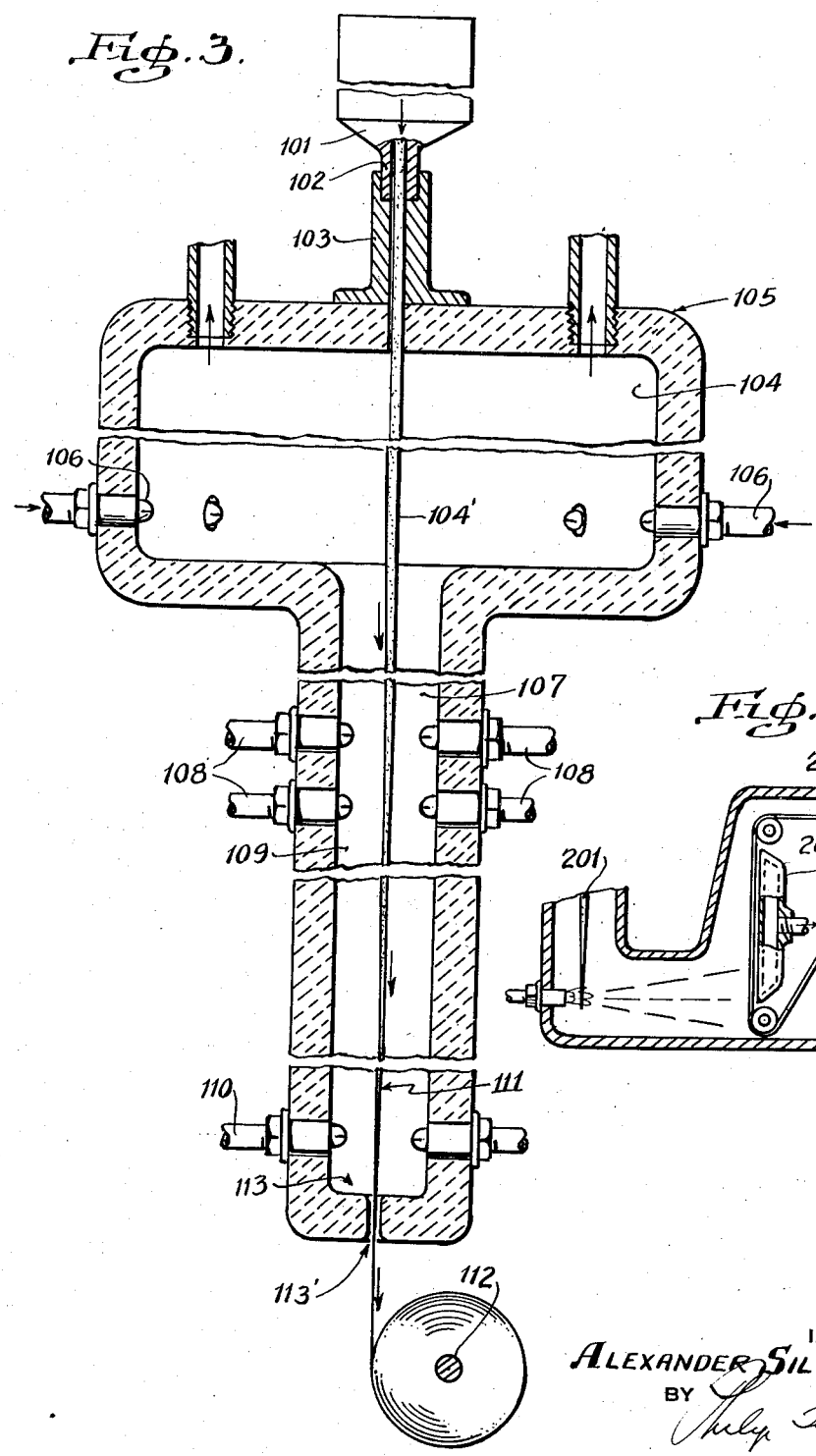
INVENTOR
ALEXANDER SILVERMAN
BY
ATTORNEY.

United States Patent Office 2,838,882
Patented June 17, 1958

2,838,882
METHOD OF PRODUCING GLASS
Alexander Silverman, Pittsburgh, Pa.
Application January 30, 1952, Serial No. 268,985
3 Claims. (Cl. 49—77)

This invention relates to improvements in producing glass.

It is an object of my invention to supply a portion or all of the heat necessary to form and melt the glass by internal exothermic heat of reaction of the glass-forming components.

It is a particular object of my invention to produce the said exothermic heat of reaction by the oxidation of metals or oxides, in their lower oxidation state, contained in the glass.

It is a further object of my invention to employ such metals as will not only enter into desirable exothermic oxidation processes, but will, on such oxidation, produce compounds which are useful as constituents of the glass-forming mix.

It is a further object of my invention to form glass shapes from such glass-forming mixtures containing the said metals and metallic compounds.

In carrying out the process of my invention, I mix the comminuted glass-forming materials, preferably in finely divided state, with a binder. I then shape them to the desired shape at relatively low, and even at atmospheric, temperatures. I then cause the glass-forming materials in the shaped form to react in the presence of oxygen or an oxygen-yielding material. The exothermic heat of reaction, aided, if necessary, by added heat, raises the glass-forming materials to their fusion point. By adjusting the proportions of the reacting materials and the externally heated environment, if such be present, the temperature of the mass may be raised to that required to give the viscosity of the molten glass desirable for the production of the shaped glass article.

The metals which I may employ in the glass-forming mixes of my invention are those whose oxides are useful in the production of the glass which it is desired to form in the reaction. The higher the heat of formation of the oxide, the smaller the quantity of the metal that will be necessary to produce the required temperature and also the external heating may be reduced or eliminated.

The result of the oxidation of the metal in the presence of the complementary oxides employed in the glass-forming mix is an oxidized product constituting a mixture or compound composed of the mixture of the oxide of the metal and the complementary oxides. Thus the oxygen from ambient oxygen or oxygen donor is preferably employed to provide the required oxygen. However, if desired to produce some additional property such as color or other artistic effect, the metal may be oxidized by reaction with one of the complementary oxides employed in the mix, limiting the oxygen supplied by the ambient oxygen or oxygen donor to produce an incompletely oxidized product, understanding this term to be one in which some elementary material, e. g. metal, is present in an unoxidized state.

I may add the oxygen required for this reaction by introducing gaseous oxygen, air or oxygen enriched air, or oxygen mixed with an inert diluent or with a combustion gas to give the desired temperature and partial pressure of oxygen.

Instead of employing gaseous oxygen, I may employ oxygen-yielding compounds of products which may be mixed with the glass-forming components. This is particularly true if the reduction product or decomposition product of the oxygen-yielding material is tolerable or useful in the glass-forming mixture.

My process is applicable to various shapes which may be formed by molding, die forming, or extrusion wherein the mixture of glass-forming material is bound together by a binder or even water under appropriate conditions, and the mass shaped into the desirable form. The mass is then raised to the fusion point by the process as described herein and the glass is formed. By regulation of the temperature in the manner described herein, the temperature is adjusted to that in which the mass has the degree of fluidity required to produce the desired shape.

My invention will be further described in connection with the production of filaments as shown in the accompanying drawings, in which Fig. 1 is a schematic drawing showing in vertical section one form of the apparatus for carrying out my invention;

Fig. 3 is a vertical section showing in schematic form a further modification of my invention; and Fig. 4 is a further modification of the procedure according to my invention.

Figure 1:
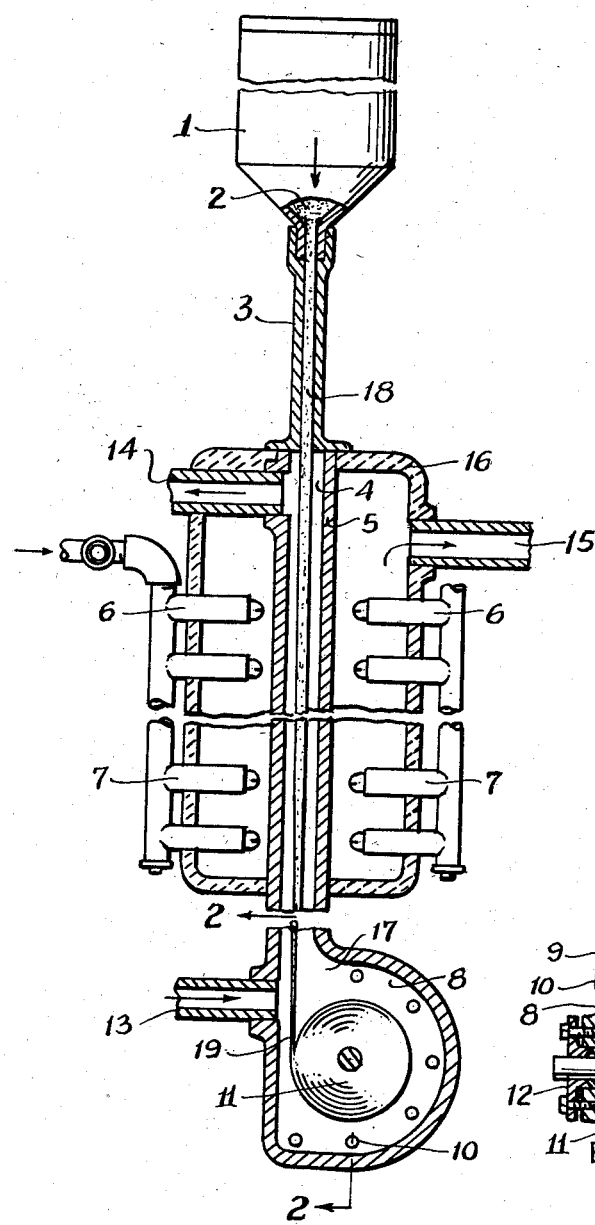
Figure 2:
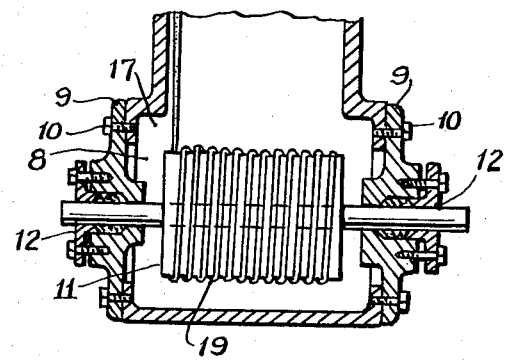
Fig. 2 is a section taken on line 2—2 of Fig. 1.

In Fig. 1 the mixture composed of comminuted elements and other glass-forming materials in comminuted state, formed as described herein, is extruded by a conventional extruder which will form a continuous rod on extrusion, such as is used in many arts for extruding plastic masses, and passed in rod form through the nozzle 2 and guide tube 3 into the reaction chamber 4. The chamber as shown in this figure is of restricted diameter to reduce the free space, and may be in the form of a muffle 5 heated by combustion gases or flames from the nozzles 6 and 7.

At the lower end of the chamber 4 is a reel chamber 8, closed by a plate 9 attached to one end of the chamber 8 by bolts 10. A reel 11 is suitably and rotatably mounted in the chamber 8 by means of a shaft and stuffing box 12. Inlet 13 and outlet 14 are provided at both ends of the reaction chamber. Suitable flue 15 is provided in the furnace 16.

The rod 18 is extruded via nozzle 2 guided by guide tube 3 and passed into the upper portion of the reaction chamber 4 where it is dried out and de-gassed, if it contains gaseous yielding or evolving materials, and baked or cured (if such binder is used) into a structure having sufficient mechanical strength to descend in the shaped form into the fusion stage of the operation. The shaped article, because of the binders and incipient fluxes used, as described below, enters the fusion stage in substantially the shape it has on formation. However, as a result of the curing or fusion of the incipient fluxes, the configuration may be somewhat altered. Thus the rod may become oval or of some other configuration, but will remain essentially a rod-like form. In the fusion stage, the rod is raised to the fusion temperature by reason of the exothermic heat of the reaction, if desired, resulting from the oxygen-containing gases introduced through inlet 13. The oxidized product is heated to the fusion temperature and heat loss in the oxidizing zone which would lower the temperature below the fusion point during oxidation is avoided. In some cases, as is illustrated by certain of the examples, the heat of formation of the oxides is so high that too high a temperature is obtained and the product may be raised above its fusion point sufficiently high to be too free flowing. The resulting fusion temperature may be maintained at a desired level or amplified or diminished by heating or cooling gases, depending upon the heat generated by the exothermic reaction in chamber 4, introduced through the nozzles 6 and 7. The rod 13 is fused and raised to a temperature to give a molten rod of the viscosity desirable for attenuation of the rod by gravity, aided, if desired, by tension produced by the reel 11, to a thread 19 of the desired diameter. In passing from the reaction chamber 4 into the reeling chamber 17, the thread 19 is cooled below its solidification and tack point so rapidly that the liquid phase is fixed in a glass state. When it is reeled onto the reel 11, it is a rigid glass structure which will not stick to the glass on the reel or to the reel itself.

In Fig. 3 the extruder 101, nozzle 102, and guide tube 103, similar to those described in connection with Fig. 1, may be employed. The extruded rod may then pass into the relatively low temperature region 104 of the furnace 105. Combustion gases may be used to heat this upper portion by means of burners 106. However, if the heat entering this zone from the region below tends to raise the temperature in zone 104 to too high a temperature, cooling gases may be introduced via the burners 106 to control the temperature for purposes to be described below.

The rod 104' then passes into the fusion stage 107 wherein it is heated by exothermic oxidation as described in connection with the process illustrated in Fig. 1, the oxidation proceeding with added oxygen-containing gases introduced via nozzle 108 positioned in reaction chamber 109 or by combined exothermic heat and heat of the flame from combustion gases introduced via 108 if no oxygen is added, or by an oxidizing flame if extra oxygen is to be added. The gas flames from such combustion gases (containing excess oxygen if such oxidizing flames are employed) via the nozzle burners 108 produce a zone having sufficient partial pressure of oxygen to sustain continued oxidation of the compounds of the rod. Additional oxygen-containing gas can be introduced through the nozzle 110 to aid in supplementing the oxygen content of the gases in reaction chamber 109 and to cool the thread 111. The exothermic heat of reaction, supplemented, if desired, by the combustion in zone 109, melts the oxides at a temperature which gives a melt of a viscosity such that under gravity and the winding tension of the reel 112, the thread attenuates to the desired diameter. It is rapidly chilled to fix the solid glassy state in thread form in the zone 113 where it is chilled by the relatively low temperature stream of oxygen gases which are then preheated and passed into the fusion zone.

Instead of forming the thread into a continuous strand wound upon a reel, the rod 201, after some attenuation, if desired, by passing vertically through the oxidation and fusion zone, as described in connection with Fig. 1 or Fig. 3, passes in front of a blast of gas. The blast attenuates the molten glas into short threads of fine diameter. The filaments are carried by the blast toward the travelling belt 202 whereon they are caught and held by the suction of the suction box 203. The filaments in travelling toward the belt are congealed and solidified. The batt so formed may be stripped from the top of the belt. In forming the rod I may, as stated above, employ metals where oxides have a high heat of formation. However, as described below, I may use metals whose oxides have a low heat of formation when using complementary metals whose oxides have a high heat of formation. I may use metals whose oxides have a relatively low heat of formation and I may supplement this heat, as stated previously, by supplementary metals or by externally applied heat.

By employing the burners described in connection with Figs. 1 and 3, the reaction zone may be maintained at the desired elevated temperature to act as constant temperature baths to prevent excessive loss of heat from the rods. The heat input required by the burners would thus be that necessary to compensate for heat losses from the thread which otherwise would occur. This is particularly important when, as in a rod of small diameter or in a thread, the ratio of the surface to volume or mass is so very high.

I may supply the oxygen not provided for by the oxygen donor by passing the shaped glass-forming material through an environment containing ambient free oxygen gas. The oxygen available will be sufficient to oxidize the elements present to their oxide form unless, by special adjustment of oxygen donor concentration and ambient oxygen, it is desired to have some of the material in elementary form in the glass, in which case incomplete oxidation is effected instead, as in the cases illustrated herein by examples, of all of the elements being in oxide form, a form which I term completely oxidized using this term to mean that all elements are in oxide form without reference to their valence state in the oxide. The heat of reaction may be sufficient to ignite the metal to convert the same to the oxide generating the heat inside the rod if the heats of formation are favorably high, thus avoiding the difficulty of transference of heat from the exterior into the interior of the rod to melt the same when employing externally applied heat.

The heat generated by the oxidation process will be uniformly generated throughout the body of the rod, particularly so if the oxidation process proceeds from an oxygen donor, so that the mass is rapidly and uniformly raised to the fusion point of the desired glass. Thus phase segregation of lower melting glasses from higher melting unliquefied components is avoided.

The glass-forming components and the reacting materials are intimately mixed with a binder. The binder may be any binder suitable for the purpose.

Thus, I may use dilute water solutions, sodium silicate and potassium silicate solutions, if the silicates are not undesirable in the mass when used in the proportions necessary to wet the particles. Depending upon the glass composition and its tolerance of the binder component, I may use clay, Portland cement and other cements as a binder, adjusting the water content to give a good cohesive and extrusive mass. Thus, I may use water or an organic binder, or the plastic adhesive binders of either the thermoplastic or thermosetting types. Such plastic compositions are well known in the art. For example, the phenolic resins, either self-hardening or heat-hardening type, the urea-formaldehyde type, or polyvinyl chlorides and chlorinated rubber and other types of adhesive products may be used, as, for example, the silicone resins. The binder, preferably, should be such as will permit the shaping of the article from particles of the glass-forming materials and either be evaporated, burned off, or otherwise eliminated, or, if not so eliminated, be suitable for inclusion in the glass mass.

Many of these binders are unstable and will be dehydrated, if dependent upon moisture, or burned, if organic, or otherwise destroyed, or will lose their binding properties at temperatures at or below the fusion temperatures of the glass to be formed. In such case I also incorporate, in addition to the low temperature binders illustrated above, comminuted, e. g. powdered, solid incipient fluxes which on fusion or reaction with the surfaces of the particles of the glass-forming materials, make a surface bond between the particles of the glass-forming materials in the shaped article.

I employ these incipient fluxes in such quantities as will cause such surface bonding to occur either by fusion or by sintering of the glass-forming particles. I employ the incipient fluxes in finely divided form and prepare a uniform and intimate mix thereof with the glass-forming materials and with the finely divided elements. If I do not desire to alter the melting point of the glass obtainable from the glass-forming materials employed with the incipient fluxes, I use these incipient fluxes also in as low an amount as possible in order to avoid undesirable modification of the composition and melting point of the resultant glass. These materials will melt at such a temperature that they will supplement the low temperature binders. The particles of the shaped mass are bonded together throughout their travel to the fusion stage. Examples of such incipient fluxes are sodium carbonate, potassium carbonate, lithium carbonate, sodium nitrate, potassium nitrate, lithium nitrate, fused mixtures of the nitrates, as, for example, mixtures of sodium and potassium nitrate, sodium and potassium phosphate, and equimolar mixtures of potassium and lithium fluoride. These incipient fluxes, all having a melting point below about 1000° C. (i. e., about 1800° F. and as low as about 447° F.), will melt below the temperature of the melting point of the glass and some of them will melt at temperatures close to the decomposition point of the low temperature bonding agent. Thus lithium nitrate melts at 251.4° C. and $NaNO_3$ 30%. $KNO_3$, 70% at 230.5° C. These incipient fluxes will react with the glass-forming materials in the mixture and on doing so will cement together the higher melting particles of the glass-forming materials. The reaction product at the surface will in most cases have a higher melting point than the incipient fluxes.

In the case of the following examples, the reaction is started by igniting the end of the rod as it passes into the reaction zone and the heat of reaction continues, aided by the addition of oxygen, to convert the metal into an oxide. The heat generated is sufficient to melt the glass at the end of the rod which is being continuously extruded. The molten glass descends in a thin filament and may be wound or blown and batted as described herein.

Example 1

I may mix a formula weight of each of magnesium and aluminum in the form of finely divided powders. It is preferable to employ the aluminum in very fine powder form, but the magnesium may be used in more granular form. The intimately mixed metallic powders are mixed with a binder, as described above, and extruded into the reaction zone. A flame from one of the burners may ignite the end of the rod. Oxygen or air or oxygen enriched air may be introduced through 110. The magnesium is ignited and ignites the aluminum, forming magnesium aluminate glass ($MgO.Al_2O_3$) which has a fusion point 2135° C. The heat of reaction is sufficient to melt the resulting oxides.

If the autogenous temperature is too high so as to form a free flowing glass of too low viscosity, I may mix with the powdered metals solid powdered magnesium aluminate or a proportion of an equimolar mixture of MgO and $Al_2O_3$, finely powdered so as to form a uniform and intimate mix. I may replace part or all of the Mg or Al with an equivalent proportion of MgO or $Al_2O_3$ as the case may be. The added oxides or aluminates absorb some of the autogenous exothermic heat of reaction in becoming molten. The resulting temperature is above the melting point of the glass, but will be at a temperature which will give a molten filament of the viscosity suitable for attenuation as described above.

Example 2

Instead of mixtures of Mg and Al, I may employ mixtures of Mg and the oxides of other metals which together with MgO give suitable glasses, employing the procedures described above and illustrated by Example 1. Thus I may use the following mixtures:

(a) Finely divided powders of Mg and $TiO_2$ in an intimate mix. The resulting glass has a melting point of above 1800° C., if I employ sufficient Mg to yield a glass containing more than four moles MgO to 1 mole $TiO_2$.

(b) I may use mixtures of powdered Mg and powdered $SiO_2$. All ratios of these components will yield glass having melting points in excess of about 1550° C. and by using Mg in proportion to give a glass containing 40% by weight or less of $SiO_2$, the fusion point will be in excess of about 1850 to 1900° C.

(c) I may use mixtures of finely divided Mg and NiO, and I may use them in all proportions, employing sufficient Mg so that the exothermic heat of reaction will raise the mixture above the fusion point and to the desired degree of viscosity of the melt. All melting points will be in excess of about 2000° C.

(d) I may use a mixture of finely divided Mg and finely divided $ZrO_2$, using sufficient Mg so that the exothermic heat of reaction will raise the mixture above the fusion point and to the desired degree of viscosity of the melt. The melting point of the resulting glass will be above about 2000° C., which is the melting point of the eutectic glass containing equimolar quantities of MgO and $ZrO_2$.

(e) Instead of zirconium oxide, I may employ chromium oxide ($Cr_2O_3$) or I may employ a formula weight of chromium oxide ($Cr_2O_3$) and a formula weight of Mg which, on ignition and fusion, will produce a glass having the composition $MgO.Cr_2O_3$ and having a melting point of about 2000° C.

(f) I may also employ magnesium powder alone and produce a fused MgO glass fiber having a melting point of about 2800° C.

The above mixtures are based on magnesium metal. I may, however, employ in place of magnesium or in addition thereto aluminum powder or other metal which may be oxidized in similar manner, and in the sense that they will so react at high temperature, each may be called pyrophoric.

With some of these metals, as, for example, when using aluminum powder, I may employ either magnesium or some oxygen donor to act as an igniter to start the oxidation, which is continued by ambient oxygen or by the oxygen donor or both.

Example 3

(a) Thus, for example, I may employ ⅔ of a formula weight of Al, a formula weight of calcium peroxide, and ⅔ of a formula weight of $Al_2O_3$. The calcium peroxide acts as an oxygen donor to oxidize the Al. The mixture is extruded and handled in the same manner as described in connection with Example 1. The resultant glass is composed of equimolar proportions of $Al_2O_3$ and CaO and will have a melting point in the neighborhood of 1600° C.

In order to increase the resultant temperature I may increase the proportion of Al, providing the excess oxygen required from ambient oxygen. If I wish to reduce the temperature attained by the oxidation of the Al, I may reduce the proportion of Al and for each formula weight of aluminum subtracted I replace an equivalent proportion of $CaO_2$ with an equivalent proportion of either CaO or with calcium aluminate ($CaO.Al_2O_3$). I thus adjust the ratio of the heat of formation liberated to the heat capacity and total latent heat of fusion of the mixture and can obtain the desirable end temperature to develop the desired viscosity in the melt.

By adjusting the ratio of CaO to $Al_2O_3$ in the final glass, I may obtain glasses of various melting points ranging upward above 1400–1500° C. in the region of $5CaO.3Al_2O_3$. A glass of composition $3CaO.5Al_2O_3$ will have a melting point of about 1700° C.

(b) Instead of using $CaO_2$, I may employ $BaO_2$. Thus I may make a mixture of ⅔ formula weight of Al powder and ⅔ of a formula weight of $Al_2O_3$ and 1 formula weight of $BaO_2$. The $BaO_2$ acts as an oxygen donor to oxidize the aluminum. I may obtain a glass having a composition $BaO.Al_2O_3$ and a melting point of about 1860° C.

(c) I may form glasses of the system $BeO-MgO-Al_2O_3$.

I may mix about 25 parts beryllium oxide with about 8.1 parts of Mg and 31 parts of Al. In the presence of the ambient oxygen, as described above, I form a glass having the composition of about as follows: 25% BeO; 13% MgO; 62% $Al_2O_3$, having a melting point of about 1750° C.

(d) I may form a glass from the three-component system $BaO.Al_2O_3$, $2SiO_2$ by mixing ⅔ of a formula weight of Al and ⅔ of a formula weight of $Al_2O_3$; two formula weights of $SiO_2$ and a formula weight of $BaO_2$. The $BaO_2$ acts as an oxygen donor in this reaction. The mixture will, when processed as described above, ignite and react to yield a glass having the composition $BaO.Al_2O_3.2SiO_2$ and having a melting point of about 1720° C.

In the following systems I may require a starter, in addition to the components of the mixture specified, to ignite the initial end of the rod, and when the rod has reached the melting temperature, the reaction will progress continuously as the rod is fed into the fusion zone, as a result of the heat of formation of the oxides, and the high temperatures thus attained in the zone of oxidation. However, if desired, the temperatures for reaction may be attained by heating the rod by the burners as described above. When using a starter, in the initial batch of the material I may add a small proportion of $CaO_2$, $BaO_2$, Mg or other igniter, such as the nitrates or chlorates or perchlorates or perborates of any of the metallic elements, to the mix containing the elementary powder described herein. The end of the rod containing the starter, on passing into the ambient oxygen-containing gas, is ignited and the heat of reaction will raise the rod to the melting point. The initial portion of the strands containing the oxides corresponding to the igniter may be discarded, if desired, and the following portions of the thread which do not contain the conversion products derived from the starter may be employed. Such glasses are illustrated in Example 4.

*Example 4*

(a) I employ a mixture made up of a formula weight of BeO and ⅔ of a formula weight of Al powder. This mixture when ignited as described above will yield a glass having the composition $BeO.Al_2O_3$ which has a melting point of about 1890° C.

(b) I may employ a mixture of 44 parts by weight of $SiO_2$ and 29.6 parts of aluminum powder and when ignited as described above I may produce a glass having the composition 56% $Al_2O_3$ by weight and 44% of $SiO_2$. Such a glass has a melting point of about 1800° C. By increasing the proportion of Al and decreasing the proportion of $SiO_2$, I may obtain glasses of even higher melting point.

(c) Instead of silica I may employ titanium oxides. The eutectic mixture of $TiO_2$ and $Al_2O_3$ has a melting point of 1715° C. and contains about 20% $Al_2O_3$. I may by increasing the percentage of Al and therefore of $Al_2O_3$ raise the melting point. Thus at about 65% $Al_2O_3$ there is another eutectic mixture which has a melting point of about 1850° C. This I can produce by mixing the above stated proportions of $TiO_2$ with a proportion of Al chemically equivalent to the above proportion of aluminum oxide.

(d) Instead of $TiO_2$ in the above mixture with Al, I may employ NiO, using a formula weight of NiO and ⅔ of a formula weight of Al powder, and ⅔ of a formula weight of $Al_2O_3$. This gives a glass having a composition $NiO.Al_2O_3$ which has a melting point of about 2030° C.

(e) Instead of NiO I may employ $Cr_2O_3$. I may employ various proportions of Al and $Cr_2O_3$, the melting point of the resultant glass being the greater the less the ratio of aluminum to $Cr_2O_3$ employed. Alumina has a melting point of about 2045° C. and $Cr_2O_3$ has a melting point of about 2275° C. The melting point of glasses fused from these materials will progressively increase from 2045° C. the less the mole percent of $Al_2O_3$. Where I employ aluminum equivalent to about .3 mole of $Al_2O_3$ or more, in proportion to .7 mole by weight of $Cr_2O_3$ or less, the heat generated will be sufficient to fuse the glass and produce a glass ranging in melting point from about 2100 to 2200° C., provided suitable precautions are taken to avoid undue heat loss as described herein.

(f) I may also employ aluminum powder alone, and by employing the starter as described herein produce $Al_2O_3$ glass filaments as described herein.

*Example 5*

I may also employ in place of aluminum, iron powder which, when finely divided, may be ignited in an atmosphere of oxygen-containing gas having a sufficiently high partial pressure of oxygen to give the oxide form desired at the temperature attained.

(a) Thus, I may employ mixtures of CaO and iron to obtain glasses composed of CaO and $Fe_2O_3$ melting at about 1200° C. For example, I may employ 3 formula weights of $CaO_2$ (which acts as the oxygen donor) and 2 formula weights of iron to yield a glass having the composition of $3CaO.Fe_2O_3$ with a melting point of about 1200° C. However, in this case I may need to supply additional heat from burners to supply the heat necessary to fuse the glass.

(b) Instead of using the complementary oxide of the glass formed as an oxygen donor, I may employ the oxide directly, as, for instance, by using CaO in the formula above given in place of $CaO_2$ and employing also ambient oxygen. I may use the mixture described above in Example 5(a), but also other mixtures to give the desired melting point.

(c) When using a suitable igniter at low temperatures or by employing some heat to start the reaction, I may employ iron powder in systems such as the three-component glass system $Na_2O-Fe_2O_3-SiO_2$. For example, an acmite glass having from 70% to 90% or greater of acmite $Na_2O.Fe_2O_3.4SiO_2$ and 30% to 10% $Na_2O.2SiO_2$ will have fusion points between 850° C. and 1000° C. and may be formed by mixing soda (in the form of soda ash), $SiO_2$ and iron powder in the proportion chemically equivalent to the above ratio of the oxides.

*Example 6*

I may form silicate glasses employing as the metal the powdered elementary silicon and employ auxiliary oxides, i. e., those which will with the $SiO_2$ form glasses of the desired composition. I may rely on oxygen donors or upon ambient oxygen or both to produce the oxidation. I may, as described above, either employ a starter or employ heat to raise the mass initially to a reaction temperature. The heat generated by the reaction may, if desired, be supplemented by additional heat from the burners as described above.

(a) I may mix 2 formula weights of calcium peroxide $CaO_2$ with a formula weight of silicon. The glass formed will have a composition $2CaO.SiO_2$ and a melting point of 2130° C.

(b) I may instead of using $CaO_2$ employ a chemically equivalent amount of CaO, relying solely on the ambient oxygen to produce the reactions.

*Example 7*

The phosphate glasses may also be formed by incorporation of elementary red phosphorus into the mix together with complementary glass-forming oxides.

(a) I may mix 3 formula weights of CaO and 2 formula weights of red phosphorus and on oxidation with ambient oxygen the mixture will yield a glass having a composition $3CaO.P_2O_5$ of a melting point above about 1700° C. The melting temperature of the glass will be the less the lower the CaO content. Below about 45% CaO the glass has a melting point below 1400° C.

(b) Phosphate glasses having a composition

$3Ba_3(PO_4)_2.BF_2$ may be made by mixing BaO, Red P and BF₂ in the proper proportions to give on oxidation of the P the above composition. The glass has a melting point of 1670° C.

(c) By mixing 5 formula weights of CaO, 2 formula weights of SiO₂ and 2 formula weights of red phosphorus these mixtures will on oxidation of the phosphorus give a glass having the composition 2CaO.P₂O₅.2SiO₂ having a melting point above 1770° C.

Example 8

(a) I may employ in Example 2(a) or 4(c) powdered titanium in a chemically equivalent amount to the TiO₂ specified in said example. I may, in order to modify the heat of reaction, reduce the proportion of Mg by substitution of MgO for some of the magnesium to reduce the resulting temperature in order to control the resultant viscosity of the melt.

(b) In place of NiO in Example 2(c), I may substitute all or a part of the NiO with chemically equivalent amounts of Ni powder, moderating the resulting temperature by a partial substitution of Mg by MgO.

I may substitute part or all of the NiO in the formulation of Example 2(c) with a chemically equivalent proportion of Ni.

(c) In place of ZrO₂ in Example 2(d), I may substitute a part or all by chemically equivalent amounts of zirconium powder.

(d) I may substitute part or all of the Cr₂O₃ in the mix specified in Example 2(e) or 4(e) by chemically equivalent amounts of powdered chromium in the same manner.

(e) In place of the SiO₂ in the composition of Example 2(b) or 3(d) or 4(b) I may substitute some or all of the SiO₂ with an equivalent proportion of Si powder.

I may substitute part or all of the SiO₂ in the formulation of Example 5(c) with a chemically equivalent proportion of Si. The additional heat of formation of the SiO₂ in the above formula, when added to the heat of formation of the Fe₂O₃ will aid the supplying of the total heat necessary for the fusion of the three-component glass.

Other metals may be employed in powder form if the heat of formation of their oxides in the ratio employed will supply such substantial contribution to the heat necessary to melt the glass as to make their use valuable. Such metals include the alkaline earth metals Ca, Ba, and Sr, in addition to the magnesium specified, and also aluminum, cerium, thorium, and misch metal, silicon, beryllium, titanium, zirconium, uranium, vanadium, molybdenum, zinc, tungsten, boron, and phosphorus. However, I may also employ the metals whose oxides are useful for incorporation in glasses even though their heats of formation are lower; for example, I may employ Ni; Cr; Ge; Mn; Fe; Zn; Cd; Co; Sn; Pb. Where the heat of formation of the oxides of the metals used is insufficient to supply the total heat necessary to produce the fused glass, I may either supply additional heat through the burners as described above or I may use an alternative or supplementary procedure as described below.

Where I make a glass employing metals whose oxides are of insufficiently high heat of formation or which are not pyrophoric in the sense that they will not generate sufficient heat when they oxidize in the ambient oxygen-containing gaseous environment to fuse the glass, I may, as described above and illustrated in the previous examples, either heat the melt or I may adjust the composition to produce a mix having a higher proportion of the metal in the mix to give the desired heat.

If this procedure is not practicable I may proceed in the following manner: Where I employ in the glass mix a metal and a supplementary oxide having a higher heat of formation per gram than the oxide of the metal employed, I may replace a portion of such supplementary oxide with an equivalent proportion of the metal of such supplementary oxide in amounts sufficient to supply the deficiency of heat resulting from the oxidation of the first mentioned metal. Thus, where the auxiliary oxide is MgO or Al₂O₃, I may employ in addition to the metals having lower heats of formation per gram of oxide, some Al and Mg.

Where the metal is not pyrophoric I may use Mg or perhaps Al plus a starter such as Mg or an oxygen donor in the manner described above.

Instead of using the metals separately mixed, I may employ alloys of the metals. Where the ratio of the plurality of metallic elements required in the formulation is not practically found in the alloys of the metals, I may use such alloys as are practical and mix them with separate metallic elements necessary to give the desired ratio.

Thus where I use Mg and aluminum, I may employ magnesium and aluminum alloys in powdered form. For example, I may use the alloys of any two of the following: B, Be, Mg, Ca, Ba, As, Zn, Cd; Si, Zr; Ce, Th. I may also employ these metals in the form of intermetallic compounds. For example, when employing metals together with silicon, I may employ them in the form of silicide of the metal such as zirconium silicide, or the silicides of Mg, Ca, Sr, Ba, Al, Be. If the composition desired permits of their inclusion, I may use ferro-tungsten, ferro-vanadium, ferro-silicon, and other intermetallic compounds. By so doing, I insure a uniform mixture of the components to give homogeneous glasses.

All of the above elements, alloys, and compounds of these elements as described above may generically be identified as elements whose oxides are glass-forming, alone or on reaction with other glass-forming materials, understanding "an element whose oxide is a glass-forming oxide" to include the oxides of each of the above listed elements whether used separately or as an alloy or as a compound which on oxidation produces an oxide or plurality of oxides where more than one element is concerned, whether the oxide enters directly into the formation of a glass or is incorporated as a modifier of glasses formed primarily of the oxides of other elements.

In addition to the oxides, for example, the oxides complementary to those generated from the metal necessary for the formation of the glass, as illustrated in the previous examples, other oxides or carbonates useful for production of glasses, depending upon the melting point and composition desired, may be used. Such materials may also act as incipient fluxes as described above. Thus, I may use those materials ordinarily employed in glass mixes and which I term, together with the materials referred to in the examples, glass-forming materials, including in the term "glass-forming materials" those materials which act as glass modifiers. Examples of these materials are, in addition to the oxides referred to above, FeO, Na₂O, Na₂CO₃, K₂O, K₂CO₃, B₂O₃ as borates or boracic acid and P₂O₅ as phosphates, GeO₂, V₂O₅. Instead of or in addition to the oxides I may use the fluorides and I may generate these fluorides from the metals of such fluorides by replacing the ambient oxygen with fluorine in the process described above to convert the metals into the corresponding fluorides.

Instead of the oxygen donors referred to in the above examples, especially where the component referred to is desirable for incorporation in the melt, I may employ as oxygen donors the so-called per salts, i. e., the percarbonates or perborates, and in some cases where the oxide exists in more than one state of valency, I incorporate the oxide in its higher state of valency and it will be reduced by the powdered metal to the lower state of valency in which state it is desired that it be incorporated into the glass.

While I have described my invention in connection with the form I now prefer as one of the most useful applications of my invention, I do not desire to be limited to the disclosed form. Other forms of apparatus may be employed to carry out the process as described herein. Other shapes than threads or filaments may be produced depending upon the shape of the extruding nozzle. Shapes need not be extruded but may be molded, die formed or shaped in other ways and subjected to the flame impingement and the heat necessary to yield glass formation in a manner equivalent to that described above in connection with the production of filaments. I may extrude or otherwise shape the bonded mass of glass-forming materials into a tube, plate, sheet, or ribbon, heat the mass to incipient fusion of the fluxes, where such are used, without alteration of the form of the article, and raise the temperature rapidly to the fusion point of the glass to produce a coherent viscous mass without substantial alteration of shape and chill the shaped and fused mass to solidify the extruded shape; for example, the extruded tube, plate, sheet or ribbon of glass. The various glass compositions, fluxes, and flames have all been given for illustration of my invention.

While I have described a particular embodiment of my invention for the purpose of illustration, it should be understood that various modifications and adaptations thereof may be made within the spirit of the invention as set forth in the appended claims.

I claim:

1. A method of forming molten glass, which comprises mixing particles of an element whose oxide is a glass-forming oxide and complementary oxides, forming the same into a coherent rod shape, passing said rod into an oxidizing zone in the presence of ambient oxygen, igniting the rod in said zone to cause oxidation of said element, feeding said rod into said zone and feeding oxygen containing gas into said zone, maintaining said rod in said zone at a temperature sufficient to melt the resulting glass mixture produced by said oxidation, and melting said rod in said zone.

2. A method of forming molten glass, which comprises mixing particles of an element whose oxide is a glass-forming oxide and an oxygen donor, forming the same into a coherent rod shape, passing said rod into an oxidizing zone in the presence of ambient oxygen, igniting the rod in said zone to cause oxidation of said element, feeding said rod into said zone and feeding oxygen containing gas into said zone, maintaining said rod in said zone at a temperature sufficient to melt the resulting glass mixture produced by said oxidation, and melting said rod in said zone.

3. A method of forming molten glass, which comprises mixing particles of an element whose oxide is a glass-forming oxide and forming the same into a coherent rod shape, passing said rod into an oxidizing zone in the presence of ambient oxygen, igniting the rod in said zone to cause oxidation of said element, maintaining said rod in said zone at a temperature sufficient to melt the resulting glass mixture produced by said oxidation, and melting said rod in said zone.

References Cited in the file of this patent

UNITED STATES PATENTS

| Number | Name | Date |
|---|---|---|
| 1,482,389 | D'Adrian | Feb. 5, 1924 |
| 1,856,303 | White | May 3, 1932 |
| 1,911,189 | Harris | May 30, 1933 |
| 1,934,263 | Hacks et al. | Nov. 7, 1933 |
| 2,038,251 | Vogt | Apr. 21, 1935 |
| 2,043,867 | Rava | June 9, 1936 |
| 2,049,765 | Fischer | Aug. 4, 1936 |
| 2,062,907 | Jeffery et al. | Dec. 1, 1936 |
| 2,156,457 | Long | May 2, 1939 |
| 2,347,968 | Ross | May 2, 1944 |
| 2,454,733 | Dahl | Nov. 25, 1948 |
| 2,566,252 | Tooley et al. | Aug. 28, 1951 |